Oct. 17, 1950  N. L. OATES  2,526,150
FISH CLEANING KNIFE
Filed April 22, 1946  3 Sheets-Sheet 1
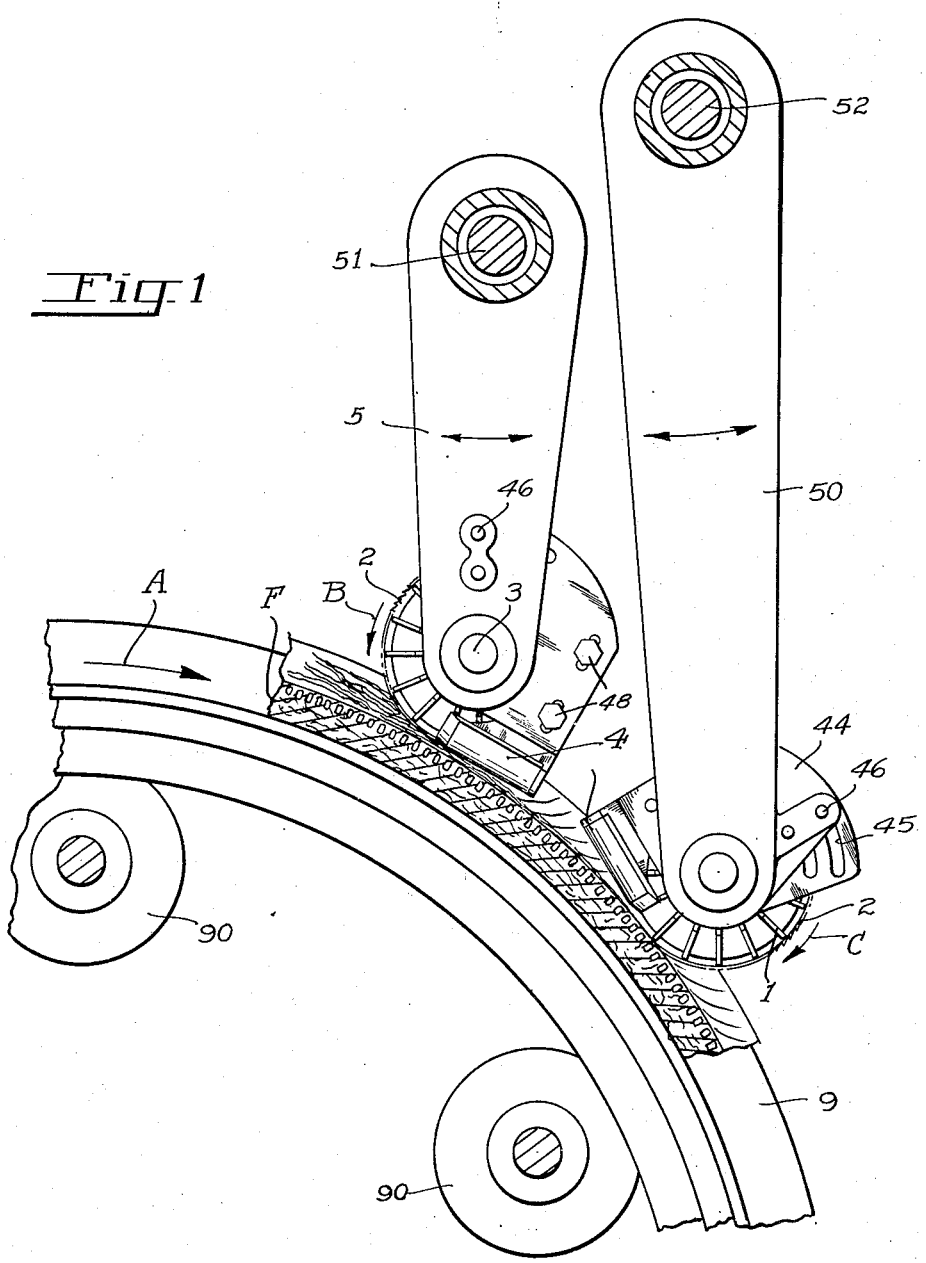
INVENTOR.
NORFORD L. OATES
BY
Reynolds Beach
ATTORNEYS Oct. 17, 1950     N. L. OATES     2,526,150
FISH CLEANING KNIFE
Filed April 22, 1946     3 Sheets-Sheet 2
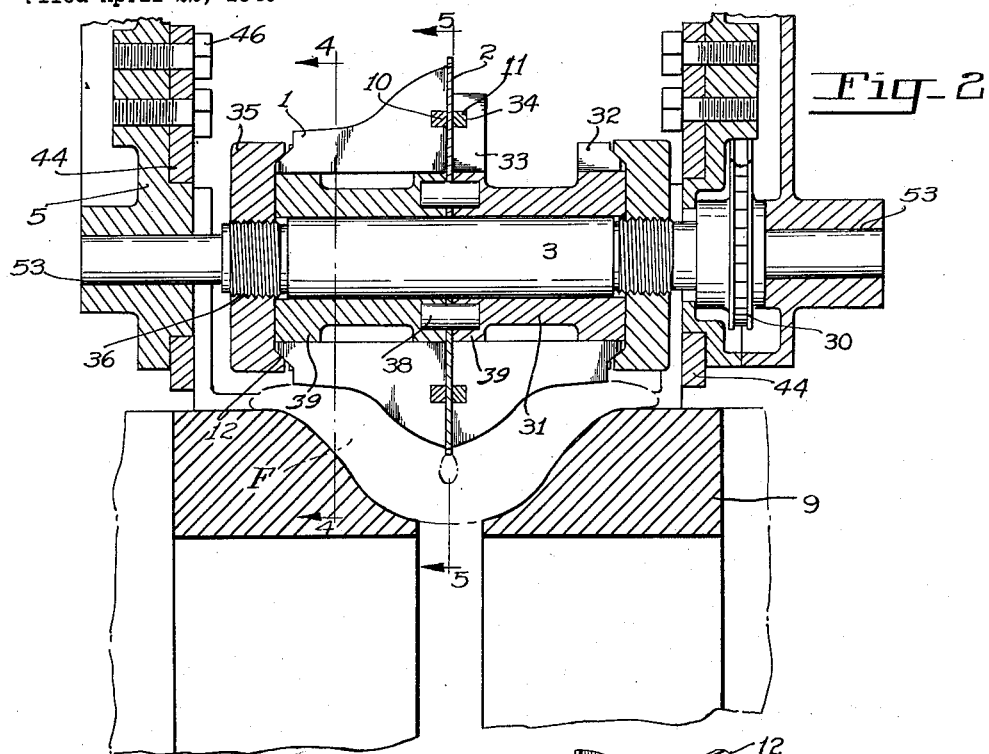
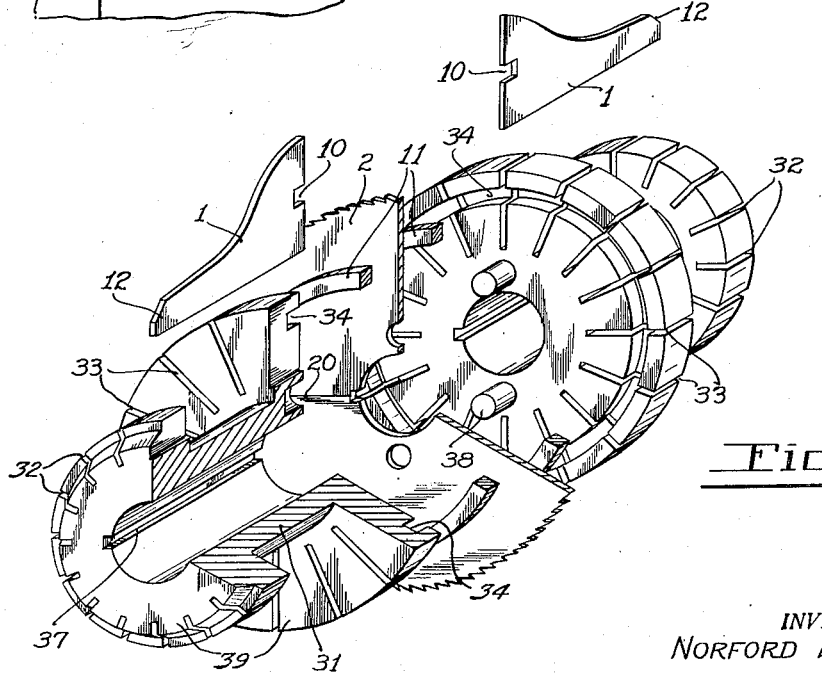
INVENTOR.
NORFORD L. OATES
BY
Reynolds + Beach
ATTORNEYS

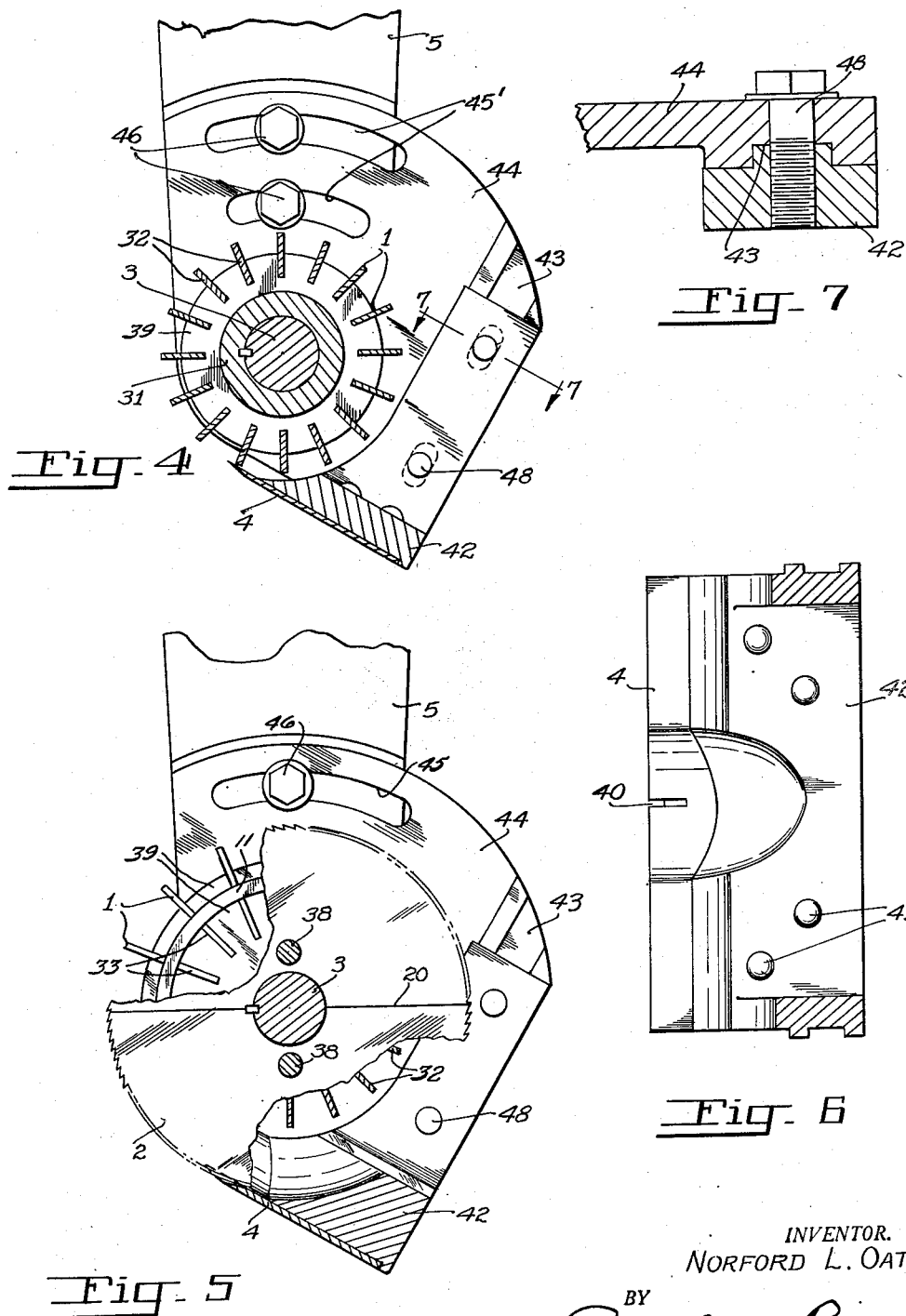

Patented Oct. 17, 1950

2,526,150

UNITED STATES PATENT OFFICE 2,526,150

FISH CLEANING KNIFE

Norford L. Oates, Seattle, Wash., assignor to Smith Cannery Machines Company, Seattle, Wash., a corporation of Washington Application April 22, 1946, Serial No. 664,102

9 Claims. (Cl. 17—3)

From the early days of mechanical fish-dressing machines rotary scrapers have been used for one or both of two purposes, first, to break down and loosen the entrails within the visceral or body cavity of the fish, and second, to complete removal of these entrails and of the blood vessel which lies along the backbone within the body cavity. Such rotary scrapers are shown in conjunction with the Iron Chink or with similar fish-dressing machines in such patents as No. 979,103 of Dec. 20, 1910, to E. A. Smith, at 60 and 71; in No. 998,129 of July 18, 1911, to E. A. Smith, at 49 and 50; in No. 1,034,525 of August 6, 1912, to E. A. Smith, at 49 and 56; in No. 1,217,-809, of February 27, 1917, to N. C. Nicholson, at 109, 116; and in No. 1,542,196 of June 16, 1925, to E. H. Waugh, at 70 and 71. While not precisely analogous, other devices for somewhat the same purpose have been devised in other forms, as, for instance, at 1 in the Brierly and Waugh Patent No. 1,244,168 of October 23, 1917.

Such devices have been made up in various forms and of various materials. The form most recently used is shown in Patent No. 1,542,196, and consists of a nearly cylindrical rotary body with a bulbous central portion, with or without a centrally disposed disk or saw, with longitudinally disposed upstanding ribs, spaced circumferentially about the body.

This scraper, at least that one which effects the final cleaning of the body cavity of the fish, in order to do a thorough job, must rotate in close contact with the walls of this body cavity, and it scrapes over the ribs of the fish, in order to remove the visceral matter embedded between the ribs. Unless such matter is thoroughly removed the entire pack may be down-graded, and a very material loss results. In the vicinity of the point where the fish's ribs join the backbone they are especially thick, stiff and hard, and the space between them is deeper and narrower than it is at the outer ends of the ribs. No material has been found, from which to make these scrapers, which will not quickly wear, first, to dull the scraping edges of the scraper's ribs, and finally to wear away the scraper's ribs to the point where the shape of the scraper departs materially from the shape of the cavity which it must scrape. The wear is especially rapid and extensive in the portion which bears on the fish's ribs adjacent the backbone, where continued efficiency is particularly necessary. The result is that in a comparatively short time, due to such wear, the scraper will not scrape cleanly, and later will not fit closely the walls of the body cavity, and therefore will not do a thorough job of cleaning. Hardening of the scraper ribs is impracticable, for they are formed as cast ridges on a cast steel body. They can be ground off and sharpened a few times, but they cannot be replaced. Replacement of the entire scraper, at frequent intervals, has been the only satisfactory solution.

It had been thought that such wear might be avoided by making the rotary scraper of rubber, with molded rubber ribs, which, by yielding, would not wear to the extent that the harder and more rigid steel ribs wear. It has been found that the rubber ribs wear also, and at no time, not even when new, do as thorough a job of cleaning as can be done by new, sharp, metal ribs. Reinforced rubber disks, as in the Brierly and Waugh Patent No. 1,244,168, were tried for at least part of the operation, but these quickly wear away. Since such fish-dressing machines are used at canneries which are in remote locations, where spare parts and repair service are not readily available, where transportation costs are high and poundage must be kept low, and where the machines must continue in steady operation for many hours a day, or continuously day and night, for days on end, while the run is on, such wear becomes a very material problem.

It is an object of the present invention to provide a scraper or rotary knife for the purposes indicated, which will remain reasonably sharp at all times, regardless of wear; which may be resharpened, if desired; and which preferably may be replaced, when badly worn, merely by the replacement of small blades, of which a sufficient number for a season's requirement may be transported and stored, ready for use, and which may be readily inserted in place in a short time, all at minimum cost and of minimum bulk and weight.

More specifically, it is the object to provide a skeletonized knife, composed primarily of blades or half-blades, together with means for assembling and retaining such blades in proper relationship, to make up a knife or scraper, to the end that such blades, when badly worn, may be discarded, and fresh blades may be inserted, to reconstitute the knife or scraper in its original form, and at its original efficiency, in a brief period of time, without dismantling or long halting the machine, and at small cost in material, transportation and labor.

It is a further object to provide such a knife which is particularly well adapted to the incorporation, when required, of a circular saw or similar disk-like element, which projects slightly from the general contour of the knife for the removal of the blood vessel along the backbone of the fish.

It is a further object to provide a rotary knife of this type and for such a purpose as has been indicated, which, being largely open when assembled, more efficiently removes the viscera by providing space, in that portion of the knife which momentarily is in its operative relationship to the body cavity, for the reception of such viscera, to be later freed from the knife by the centrifugal effect.

Since wear is inevitable, it is one object of the present invention to provide a knife in such form that, regardless of wear, it is always in reasonably good and efficient operative condition, and furthermore, to provide in conjunction with such a knife a presser blade, which in itself is old, but which is so mounted as to be adjustable with relation to the knife, as the latter wears, so that the efficiency of the cooperative combination of the knife and presser blade is always kept at or near a peak.

Also, in connection with the latter object, it is an object to accomplish such adjustment of the presser blade relative to the knife to compensate for wear of the latter in such manner as will not affect the adjustability of the presser blade rotationally about the knife to vary its operative relationship, as has heretofore been required.

It is in general, then, the object of the present invention to simplify and improve the efficiency, and to lessen the cost, while increasing the convenience and maintaining the ruggedness, of the knife and its cooperating parts.

With these and other objects in mind, as will appear hereinafter, the invention comprises the novel knife, and the novel arrangement thereof with relation to associated parts, as shown in the accompanying drawings, and as will be hereinafter described and particularly pointed out in the specification and claims, respectively.

In the accompanying drawings the invention is shown in typical forms, such as are now preferred by me.

Figure 1 is a general elevation of two such knives, shown in operative relationship to the fish-dressing machine and to a fish thereon, parts of the fish-dressing machine and of the fish being shown in section along a plane which includes the fish's backbone.

Figure 2 is an axial section through one such knife and its mounting and drive mechanism, and Figure 3 is an isometric exploded view of the same, with certain parts shown in section.

Figure 4 is a section substantially along the line 4—4 of Figure 2, and Figure 5 is a section on the line 5—5 of Figure 2.

Figure 6 is a plan view of the presser blade, with its guide in section, and Figure 7 is a detail sectional view, indicated by the line 7—7 in Figure 4.

The general nature, purposes, and location of such knives are clearly understandable by reference to the Waugh Patent No. 1,542,196, wherein analogous knives or scrapers are shown at 70 and 71. They are located in the path of the fish's advance, to engage within the visceral cavity of the fish after its belly has been slit and the sides have been laid back to expose the viscera. In Figure 1 herein the bull ring 9 of the Iron Chink, supported and guided for rotation in the direction shown by the arrow A by the rollers 90, grips and advances a fish F eventually to the station where the first such knife is yieldably supported in position to engage fish of different sizes. Passing on, the fish is almost immediately engaged by the second such knife, similarly arranged.

The two knives may be slightly different in shape, but this is largely immaterial, and the principal difference between them, which is here material, is that the first one rotates in the direction of the arrow B towards the presser plate 4, located beyond the knife in the direction of advance of the fish, as shown by the arrow A, while the second knife rotates in the opposite direction, as indicated by the arrow C, though still towards the near-side presser plate 4, but reversely to the first knife, and in opposition to the direction of advance of the fish. The first such knife serves primarily to loosen the entrails, while the second knife is intended to effect removal of the viscera from within the body cavity of the fish. Usually a following brush completes the cleaning, acting to remove loose particles.

Since the two knives are substantially identical in construction, a description of the first one will suffice. A central arbor 3 constitutes the rotative support for the knife, and is itself rotated by means of the sprocket wheel 30. Upon the arbor 3 is mounted a spool, or preferably two spools 31, forming a rotative core, said spools having their end flanges 39 slit in generally radial axial planes, as indicated at 32 and 33. The choice as to whether one spool shall be used, of a length to span the entire body cavity of the fish, or two spools, each of a length to extend from the plane which includes the backbone of the fish, to one side or the other of the body cavity, depends largely upon whether or not it is desired to employ a central disk or partition 2, lying in the transverse plane which includes the fish's backbone, or to omit such a disk or partition. Preferably such a disk or partition is employed, and its arrangement and purpose will be pointed out shortly. It is interposed between and is abutted by the inner flanges 39 of the spools 31.

Within the slots 32, 33 are received blades 1, or when the disk 2 is employed, half-blades, which when all assembled in the slots 32 and 33 surrounding the spools 31, and at opposite sides of the central disk 2, define a rotary knife of a shape to engage the walls of the body cavity of the fish F. These blades are made of thin, tough steel, for example of hard saw steel, so that they may be sharp and will keep relatively sharp, and will not wear quickly.

The slots 32, 33 may lie in such planes, other than strictly radial, as are disclosed in the patents referred to for example, as at 109 in the Nicholson Patent No. 1,217,809, or at 74 in the Waugh Patent No. 1,542,196.

It is necessary to retain such blades within their slots, and preferably the securement of the blades is accomplished by movement of the blades, relatively to the spools, axially of the latter, so that they will not be disengaged by centrifugal action as the knife rotates. As a convenient and practical way of so doing, but by no means the only practical way, I may provide at one end of the blades a notch 10, and the spool flange at this end is complementally notched, as indicated at 34, to receive a locking ring 11. The ring 11, received in the notches 34 and 10 and abutting the disk 2, affords a shoulder, behind which a complemental shoulder afforded by the notch 10 of the blade seats, to prevent radially outward movement of this end of the blade.

The opposite end of the blade is similarly secured by relative axial movement, as by a locking ring or nut 35 threading at 36 upon the arbor, carrying an internally coned edge which engages and bears upon the complementally tapered outer end 12 of the blade. By these or similar means each blade, and all of them simultaneously, are securely locked in assembled position in the collars or flanges 38, 39 of the spools 31, and with relation to the disk 2 which is clamped between the blades and the spools. The entire assembly rotates with the arbor 3. To insure proper drive between the arbor and the blades the spools may be keyed, as indicated at 37 (see Figure 3), to the arbor 3.

Since the blades may be readily assembled in place or removed, to be replaced by new blades, simply by backing off the nuts 35, it being unnecessary to remove the arbor 3 from its mount, it is also desirable to remove the disk 2 in similar fashion, for the purpose of the latter is to project slightly beyond the general outline of the assembled blade, so that it may in particular loosen and remove the blood vessel along the base of the ribs at their junction with backbone. The disk 2 may have saw teeth about its edge to assist in accomplishing this purpose. The saw, then, for ease of removal and replacement, is diametrically split, as indicated at 20, and it is necessary to secure the saw for proper driving, and so that its two halves will not separate. Dowels 38, projecting axially from one spool into the other, and through holes provided in each half of the saw 2, secure the respective halves, in conjunction with a third bearing which is provided by the seating of the edges of the two halves along the line of slit at 20.

The presser blade 4, as heretofore, is shaped to fit closely about the contour of the knife assembly, and to extend along the length thereof, with its edge in operative position in the general zone where the knife blades are in operative engagement with the viscera. The function of these presser blades is both to limit movement of the knife toward the fish, and to effect separation from the knife of the viscera which might otherwise tend to follow the knife in its rotation. For effective performance the presser blade should always lie close to the path of the edges of the knife blades. Since wear of the latter is unavoidable, heretofore the presser blade, while rotationally adjustable about the axis of the knife to different positions of use, has not been adjustable radially towards and from the knife's axis of rotation, and hence with increasing wear has become decreasingly effective to perform its proper function. The present invention provides for generally radial adjustment of the position of the edge of the presser blade with relation to the rotary knife, and yet this adjustment does not interfere with, but operates in conjunction with, the desired rotational adjustment of the edge of the presser blade to different operative positions.

Thus the presser blade 4, properly contoured to fit the knife, and having a slit 40 into which the projecting edge of the saw 2 may fit, is mounted, as, for example, by the rivets 41, upon a U-shaped yoke 42, the arms of which are guided at 43 by side plates 44, to be held in adjusted position by set screws or bolts 48. The guide 43 is so related to the edge of the presser blade 4 and to the axis of the knife that adjustment of the yoke 42 along this guide adjusts the edge of the blade substantially radially towards or outwardly from the axis of the arbor 3, and of the knife assembly.

The side plates 44 are rotatively supported concentrically of the arbor 3, for angular adjustment about the axis of the arbor, with relation to supporting arms 5 or 50, which in turn are swingably mounted at 51 and 52, respectively, upon a fixed frame member (not shown). Arcuate slots 45 in the side plates 4 and set bolts 46 permit arcuate adjustment of the side plates 44, and consequently of the edge of the presser blade 4 about the axis of the rotary knife. While the precise form of these parts in the first and second knives is not identical, the two are sufficiently similar that detailed differentiation is believed unnecessary.

As can be seen in Figure 1, the first knife, being mounted upon its arm 5, may yield somewhat towards or from the path of the fish to accommodate larger or smaller fish, and the second knife is similarly supported upon its arm 50, and is similarly yieldable. Springs may be employed, if desired or required, to urge the knives more strongly towards the fish, and limit stops to limit such movement; neither are herein shown, but have been shown in certain of the patents referred to for example, at 91 in Waugh Patent No. 1,542,196. The location of the edge of the presser blade 4 with relation to the zone of operative engagement of the knife with the fish is important, because this location of the edge of the presser blade 4 must be varied if the fish run large, or if they run small. To accommodate this the angular adjustment by means of the slot 45 and bolts 46 is provided.

As Figure 2 illustrates, the arbor 3 is in fact journaled at 53 in the swinging arms 5 or 50, and one such arm in each assembly may be made hollow to contain a chain for transmission of power to the sprocket wheel 30, to rotate the arbor and the assembly thereon.

The manner of construction and assembly of such a knife, the adjustments thereof, and the replacement of the parts therein, have already been made clear. It is believed the advantages of such a knife will be equally apparent, for it is conveniently possible to transport to the cannery large quantities of replacement blades 1 and saws 2, and entirely feasible to shut down the machine for a short time, sufficient to permit replacement of the blades of a knife when they have been too badly worn to be of further use. It is not necessary even to remove the arbor from its mount to effect such replacement, and, moreover, the blades are of such character that they will maintain their sharpness even while wearing away, and are of such material as will wear but slowly.

I claim as my invention:

1. A rotary knife for fish-cleaning machines, comprising a plurality of separate blades operatively disposed in generally radial planes about an axis of rotation, and of such size and shape that their edges collectively define a body of revolution to engage that wall of a fish's body cavity which lies at one side of its backbone, a second like set of blades similarly disposed, shaped, and sized, and located relatively to the first such set, to engage the wall of the fish's body cavity at the opposite side of its backbone, a circular saw divided sectorially into a plurality of parts, interposed between and abutted by the inner ends of the blades of each set, means interengageable between the blades and each sector of the saw, to mutually and releasably secure the blades, at this end, and the saw sectors, in such relationship and to prevent radial movement of the thus assembled blades and saw sectors, and releasable means engaged with the outer ends of each set of blades to retain them in the described operative disposition.

2. A rotary knife for fish-cleaning machines comprising two coaxially disposed spools having radial slits in their end flanges, a transverse partition interposed between and rotatively interlocked, by relative axial movement, with said spools, the end face of that flange of each spool which abuts said partition being circularly grooved in a manner to intersect said slits, a plurality of separate half-blades disposed between the flanges of the respective spools, with their ends received in the slits thereof, and collectively formed to engage the walls of a fish's body cavity, each half-blade, at the end which abuts the partition, being notched in registry with the groove of the flange, a ring received in each such groove, and by engagement within the notches of the several half-blades locking this end of the latter against all relative movement other than axially away from the partition, and securing means engageable with the outer ends of all the half-blades to secure them against such axial movement, and against radial movement, relative to the spool.

3. A rotary knife for fish-cleaning machines comprising two coaxially disposed spools having radial slits in their end flanges, a transverse partition interposed between and rotatively interlocked, by relative axial movement, with said spools, the end face of that flange of each spool which abuts said partition being circularly grooved in a manner to intersect said slits, a plurality of separate half-blades disposed between the flanges of the respective spools, with their ends received in the slits thereof, and collectively formed to engage the walls of a fish's body cavity, each half-blade, at the end which abuts the partition, being notched in registry with the groove of the flange, a ring received in each such groove, and by engagement within the notches of the several half-blades locking this end of the latter against all relative movement other than axially away from the partition, the outer ends of the half-blades being beveled, and a locking ring complementally beveled movable axially relative to each spool and said beveled blade ends, to secure them against radial or axial movement relative to their spool.

4. A rotary knife, for the purpose and constructed as set forth in claim 2, wherein the partition is formed as a circular saw, projecting slightly beyond the collective pattern of the blades.

5. A rotary knife, for the purpose and constructed as set forth in claim 2, wherein the partition is formed as a disk divided into a plurality of parts; and locking means interengageable by relative axial movement between the spools and each of said parts, to retain the disk's parts in assembled relationship, the blade-securing means being also operatively engageable with the spools to retain them against axial separation, and thereby to lock the disk's parts in assembled relationship.

6. A rotary knife for fish-cleaning machines comprising an arbor, a circular disk divided diametrically into halves, and received upon said arbor, two spools upon said arbor, one at each side of said saw, dowel pins joining said spools and passing through the disk halves to lock the latter to the spools, the flanges of said spools being slit in generally radial planes, half-blades received in said slits, abutting said disk, and interlocked with the inner flange of each spool against relative radial movement, the blades collectively defining a pattern to engage the walls of a fish's body cavity, and a locking ring threaded upon each end of the arbor, formed and arranged to encircle the outer ends of all half-blades at the respective ends of the knife, to secure such outer ends against radial and axial separation from the spools, and to retain the disk locked to the spools.

7. A rotary knife for fish cleaning machines comprising a rotative core, a partition disposed normal to the core's rotative axis, generally centrally between the core's axial ends, a plurality of bearing walls on said core at the axially opposite sides of said partition, each disposed substantially radially of the core, a plurality of inserted knife blades disposed at axially opposite sides of the partition, each in a substantially radial plane and in engagement with one of said bearing walls, the inner end of each blade being disposed adjacent said partition, blade-retaining means carried by the core and engaged by such inner ends of the blades to retain such inner blade ends against radially outward movement by centrifugal force during rotation, and means engaged with the outer ends of the blades at opposite sides of the partition, to retain them against radially outward movement.

8. The rotary knife defined in claim 7, in which the blade retaining means includes an axially extending shoulder facing radially inward and in which the end of the inserted blade is engaged with such shoulder, by insertion of the blade axially toward the partition.

9. A rotary knife as defined in claim 7, in which the core is formed, adjacent each side of the partition, with a circumferential shoulder extending axially away from the partition, and facing inwardly towards the axis, each blade's inner end being formed with a complemental outwardly facing shoulder, spaced radially inwardly from the core's shoulder, and in which the retaining means for the inner end of the blades includes a ring interposed between the blade's shoulders and the core's shoulder, and engageable by insertion of the blades in an axial direction.

NORFORD L. OATES.

REFERENCES CITED

The following references are of record in the file of this patent:

UNITED STATES PATENTS

| Number | Name | Date |
|---|---|---|
| 981,300 | Munn | Jan. 10, 1911 |
| 1,137,448 | Anderson | Apr. 27, 1915 |
| 1,324,581 | Boesch et al. | Dec. 9, 1919 |
| 1,542,196 | Waugh | June 16, 1925 |
| 2,177,013 | Zandt et al. | Oct. 24, 1939 |

FOREIGN PATENTS

| Number | Country | Date |
|---|---|---|
| 488,159 | Great Britain | July 1, 1938 |
| 558,384 | Great Britain | Jan. 4, 1944 |